US006607584B2

(12) United States Patent
Moreau et al.

(10) Patent No.: US 6,607,584 B2
(45) Date of Patent: Aug. 19, 2003

(54) ADSORBENT WITH IMPROVED MASS TRANSFER FOR A VSA OR PSA PROCESS

(75) Inventors: Serge Moreau, Velizy Villacoublay (FR); Xavier Badiche, Paris (FR)

(73) Assignee: L'Air Liquide-Societe Anonyme a Directoire et Conseil de Surveillance pour l'Etude et l'Exploitation des Procedes Georges Claude, Paris Cedex (FR)

( * ) Notice: Subject to any disclaimer, the term of this patent is extended or adjusted under 35 U.S.C. 154(b) by 0 days.

(21) Appl. No.: 10/098,447

(22) Filed: Mar. 18, 2002

(65) Prior Publication Data

US 2003/0015092 A1 Jan. 23, 2003

(30) Foreign Application Priority Data

Mar. 16, 2001 (FR) .................................. 01 03607

(51) Int. Cl.$^7$ .............................................. B01D 53/04
(52) U.S. Cl. ........................... 95/117; 95/130; 95/138; 95/139; 95/140; 95/143; 95/902
(58) Field of Search .................... 95/96–106, 130, 95/138–140, 902, 117, 143–147; 96/108, 130, 143, 144

(56) References Cited

U.S. PATENT DOCUMENTS

| 5,672,195 A | | 9/1997 | Moreau et al. ................ 95/96 |
|---|---|---|---|
| 5,922,107 A | * | 7/1999 | Labasque et al. ............... 95/96 |
| 6,022,397 A | * | 2/2000 | Rouge et al. ................... 95/96 |
| 6,068,678 A | * | 5/2000 | Labasque et al. ............... 95/96 |
| 6,171,370 B1 | * | 1/2001 | Hirano et al. ................... 95/96 |
| 6,221,492 B1 | * | 4/2001 | Moreau et al. ............. 428/402 |
| 6,328,786 B1 | * | 12/2001 | Labasque et al. ............... 95/96 |
| 6,425,939 B1 | * | 7/2002 | Moreau et al. ................ 95/117 |
| 2001/0027723 A1 | * | 10/2001 | Jain et al. ....................... 95/96 |
| 2002/0014159 A1 | * | 2/2002 | Tatsumi et al. ............... 96/130 |

FOREIGN PATENT DOCUMENTS

| EP | 0 940 174 | 9/1999 |
|---|---|---|
| FR | 2 792 220 | 10/2000 |
| WO | WO 99/43417 | 9/1999 |
| WO | WO 99/43418 | 9/1999 |

* cited by examiner

Primary Examiner—Robert H. Spitzer
(74) Attorney, Agent, or Firm—Young & Thompson

(57) ABSTRACT

A formed adsorbent material includes an adsorbent solid phase and a gas phase ensuring transport of the gaseous components right to the adsorbent, being such that the constants for the transport kinetics of the components adsorbable in the gas phase and in the solid phase are in a ratio of between 0.1 and 10 defined for a gas discharge velocity of 0.2 m/s measured on air at 1 bar and 20° C. or in a ratio of between 0.1 and 10, defined for a gas discharge velocity of 0.01 m/s measured on hydrogen at 30 bar and 40° C.

17 Claims, No Drawings

ADSORBENT WITH IMPROVED MASS TRANSFER FOR A VSA OR PSA PROCESS

The invention relates to a formed ellipsoidal adsorbent material, for example in the form of cylindrical or elliptical beads or rods, or the like, which can be used to purify or separate gas mixtures, especially gas mixtures that can be used in a PSA (Pressure Swing Adsorption) or VSA (Vacuum Swing Adsorption) process.

"High productivity" production cycles are characterized especially by a rapid alternation of the adsorption/desorption cycles, which amounts to adsorbing the amount of gas corresponding to the capacity of the adsorbent in a short space of time.

To do this, it is desirable to have adsorbents in which mass transfer between the gas phase and the adsorption sites is rapid.

To do this, it has already been proposed to reduce the size of the granular adsorbent particles or to improve the transport capabilities of the adsorbent particles with no, or little, change in their size.

It is also possible for the adsorbents to be in a monolithic form, for example in "honeycomb" form or "millefeuille" form.

However, although in theory it is always possible to increase the rate of adsorption of an adsorbent by reducing the scale of contact between the gas phase and the solid phase or the surface-to-volume ratio of the adsorbent, this leads in general to adsorbent configurations creating many head losses. This therefore results in a considerable expenditure of energy and, consequently, is to the detriment of the industrial profitability of the production process using these adsorbents.

Adsorbents having a high adsorption rate are described, for example, in the patents WO-A-99/43415, WO-A-99/43416, WO-A-99/43417, WO-A-99/43418 and EP-A-0940174 which relate to processes using zeolite agglomerates whose kinetic properties have been improved for better use in VSA/PSA applications. However, the approaches described relate only to improving the transport properties of the particles.

A theoretical approach has been given by Perera et al. in Trans. IchemE, Vol. 76, Part A, November 1998, pp. 921–941 and by Ruthven et al. in Separation and Purification Technology, No. 12 (1997), pp. 43–60 and No. 13 (1998), pp. 181–193.

A comparison between the performance of monoliths and granular beds is presented therein. However, although the individual improvement factors are given, namely the channel diameter and bead diameter, the diffusivity of the adsorbent phase, thickness of the adsorbent layer, density of the adsorbent phase and adsorption properties, these documents provide no teaching as regards the optimization of these parameters and a person skilled in the art would, in practice not know which route to follow.

In fact, it appears that none of the routes explored is ideal as various problems are encountered when implementing them, such as excessive head loss problems in the case of small particles or practical processing problems in the case of monoliths, or else changes to the associated properties in the case of particles with improved porosity, such as, for example, the reduction in mechanical strength or the reduction in density when the porosity becomes too high.

Starting from this situation, the object of the invention is to propose an improved adsorbent that can be used in a PSA or similar process, which does not have the drawbacks of the prior art, and to do so by judiciously taking into account both the properties of the adsorbent material and its geometry with respect to the gas phase which ensures transport of the adsorbates.

In other words, the object of the invention is to propose an adsorbent whose geometrical and intrinsic characteristics result in its optimum use in rapid adsorption cycles for the production or separation of gas, and to do so whatever the particular form chosen for this adsorbent.

Put another way, the invention allows the transport properties of the material and its geometry to be precisely adjusted, taking into account other criteria such as head losses.

The invention therefore relates to a formed adsorbent material comprising an adsorbent solid phase and a gas phase ensuring transport of the gaseous components right to the adsorbent phase, the material being such that the constants for the transport kinetics of the components adsorbable in the gas phase and in the solid phase are in a ratio of between 0.1 and 10 defined for a gas discharge velocity of 0.2 m/s measured on air at 1 bar and 20° C.

The invention also relates to a formed adsorbent material comprising an adsorbent solid phase and a gas phase ensuring transport of the gaseous components right to the adsorbent phase, the material being such that the constants for the transport kinetics of the components adsorbable in the gas phase and in the solid phase are in a ratio of between 0.1 and 10 defined for a gas discharge velocity of 0.01 m/s measured on hydrogen at 30 bar and 40° C.

The invention also relates to a process for separating or purifying a gas mixture by adsorption of at least one gaseous compound from the gas mixture on an adsorbent material according to the invention, preferably a PSA or VSA process.

Depending on the case, the process may include one or more of the following features:

the gas mixture contains oxygen and nitrogen;

at least some of the nitrogen is adsorbed on the adsorbent material so as to produce an oxygen-enriched gas stream, the gas mixture preferably being air;

the gas mixture to be purified contains hydrogen and at least one impurity chosen from CO, $CH_4$, $CO_2$, $O_2$, and $N_2$;

at least some of the impurities are adsorbed on the adsorbent material so as to produce a hydrogen-enriched gas stream;

the gas mixture to be purified is air containing at least one impurity chosen from $CO_2$ and $H_2O$;

at least some of the impurities are adsorbed on the adsorbent material so as to produce purified air stripped of at least some of the impurities, the purified air obtained preferably being subsequently subjected to a cryogenic distillation step; and the gas mixture contains at least hydrogen and CO.

The invention will be more clearly understood from the following explanations.

An adsorber usually comprises an adsorbent solid phase formed from one or more adsorbent materials and a permeable gas phase through which the gases to be separated flow from the inlet to the outlet of the adsorber, the components to be removed being fixed on the solid phase. This gas phase is called "circulating gas phase" or more simply "gas phase".

The difference between the inlet pressure and the outlet pressure, necessary to make the gas flow, is called the head loss. The head loss is responsible for an additional consumption of energy detrimental to the economics of the process.

The solid phase includes a network of pores, the mean size of which is usually between 0.020 µm and 20 µm approximately, this being called a "macropore network".

There may be a network of even smaller pores, called "micropores", this being encountered, for example, in microporous carbon adsorbents or zeolites.

The solid phase may be deposited on a non-adsorbent support, the function of which is to provide mechanical strength or support, or else to play a thermal conduction role or to store heat.

Displacement of the gaseous species takes place in the macropore network by molecular diffusion or by the Knudsen mechanism, or else by surface diffusion. However, in cases when the total pressure varies, the mechanism of Poiseuille flow may also come into play.

The phenomenon of adsorption comprises two main steps, namely passage of the adsorbate from the circulating gas phase onto the surface of the solid phase, followed by passage of the adsorbate from the surface to the volume of the solid phase into the adsorption sites.

Transport in the circulating gas phase can take place, if the flow is laminar, by convection in the direction of flow and by diffusion perpendicular to the flow, or, if the flow is turbulent, by convection and then isotropic diffusion in the boundary layer.

In the case of the solid phase, mass transfer takes place by diffusion except in extreme cases in which the head loss induces convection through the solid; however, these cases are rare since the macropore phase is much more permeable than the circulating gas phase.

The mass transfer rate in the solid phase is then characterized by a rate constant or kinetic constant:

$$\tau_s = \frac{D_s}{R_s^2} \quad (\text{in } s^{-1}) \tag{1}$$

where $D_s$ is the diffusion coefficient in the porosity of the solid phase, also called the macropore diffusion coefficient, and $R_s$ is the characteristic dimension of the solid medium.

The transfer rate in the gas phase is characterized:

in the laminar regime, by a transverse rate constant $$\tau_g = \frac{D_g}{R_g^2} \quad (\text{in } s^{-1}) \tag{2}$$

where $D_g$ is the diffusion coefficient in the gas phase and $R_g$ is the characteristic dimension of the gas medium;

in the turbulent regime, by the diffusion through the boundary layer, with a rate constant:

$$\tau'_g = k_f \times \frac{S}{V} \quad (\text{in } s^{-1}) \tag{3}$$

Where S/V is the surface-to-volume ratio and $k_f$ is the transfer coefficient of the film.

The nature of the regime depends on the Reynolds number (Re) and on the geometry of the flow.

Thus, in linear channels of any cross section, the flow is in the laminar regime for Re<2000 and in the turbulent regime for Re>3000 (see "Techniques de l'ingénieur [Engineering Techniques]", Chapter J 1065).

The Reynolds number is given by the following formula:

$$Re = \frac{\phi \times \rho \times u}{\eta} \tag{4}$$

where $$\phi = \frac{4 \times A}{P}$$

is the hydraulic diameter (in m), A is the cross section (in m²) and P is the perimeter (in M):

η is the dynamic viscosity of the gas (in Pa.s);

u is the velocity of the gas (in m/s)—in this case, the discharge velocity is equal to the actual velocity. The term "discharge velocity" is understood to mean the actual flow rate of the gas divided by the flow cross section within the adsorber;

ρ is the density of the gas (in kg/m³).

For example, for u=1 m/s, ρ=1.3 kg/m⁻³, η=2×10⁻⁵ Pa.s and D=1×10⁻³ m, be obtained Re=67.

Thus it may be seen that in the case of linear pipes, the flow is in the laminar regime up to velocities of several tens of metres per second.

Moreover, in granular beds, the flow is in the turbulent regime for Re>6 (see "Techniques de l'ingénieur", Chapter J 1065).

The Reynolds number is then given by:

$$Re = \frac{\phi \times \rho \times u}{\eta}$$

where $$\phi : \frac{4 \times A}{P}$$

is the hydraulic diameter (in m),

A is the cross section (in m²), P is the perimeter (in m), and ρ are as defined above and u is the actual velocity of the gas (in m/s) which is equal to (discharge velocity× tortuosity)/porosity, the tortuosity being that of the bed.

For 1 mm particles, we again have Re=67. Thus, in a granular bed, the flow may be seen to be in the turbulent regime.

The diffusion coefficients D and the film transfer coefficient are calculated in the manner as taught by D. M. Ruthven in "Principles of adsorption and adsorption processes", John Wiley & Sons, 1984 (hereafter D. M. Ruthven) or by R. T. Yang in "Gas separation by adsorption processes", Butterworth Publishers, 1987 or else by J. Karger and D. M. Ruthven in "Diffusion in zeolites and other microporous solids", John Wiley & Sons, 1992.

$D_g$ is called the molecular diffusion coefficient, this being characteristic of a component present in a gas mixture at a given pressure, temperature and composition; this calculation may be found, for example, in "Diffusion in zeolites and other microporous solids", Kärger and Ruthven, John Wiley & Sons, 1992, pp. 87 to 98.

$D_s$ is the macropore diffusion coefficient—in a simple model, $D_s$ may be expressed, in particular, as a function of the porosity δ and the tortuosity τ of the solid phase.

Thus, we obtain:

$$D_s = D_g \times \frac{\varepsilon}{\tau} \quad (5)$$

However, formula (5) above is given merely as an illustration and a different formula could be used to define $D_s$ as a function of $D_g$, without thereby departing from the concept of the present invention.

For example, a limit on the transfer rate in the solid phase may also result from the micropore network, for example in the case of an agglomerated zeolite or a carbon molecular sieve. In this case, $D_s$ may be modified, by varying the size of the zeolite crystals or the size of the micropores in the carbon molecular sieve.

However, it is possible to measure $D_s$ directly if formula (5) is not regarded as being sufficient, as emerges, for example, from D. M. Ruthven's "*Principles of adsorption and adsorption processes*" Chapter 5.2, p. 127 et seq. It may be necessary, depending on the measurement method chosen, to measure the adsorbent in its definitive form, or else the adsorbent phase alone, that is to say without the passage structure which constitutes the circulating gas phase.

Moreover, $k_f$ is calculated from the Petrovic and Thodos formula (see D. M. Ruthven, page 214), namely:

$$Sh = 0.357/\varepsilon \times Re^{0.64} \times Sc^{0.33} \quad (6)$$

where:

$\varepsilon$ is the porosity of the adsorbent $$Sh = \frac{\phi \times k_f}{D_g} \text{ is the Sherwood number} \quad (7)$$

$$Sc = \frac{\eta}{\rho \times \phi} \text{ is the Schmidt number} \quad (8)$$

Furthermore, the head losses are calculated as follows:
in the case of a straight pipe:

$$\frac{\Delta P}{L} = \frac{32 \times \eta}{\phi^2} \times u \text{ (in Pa/m)} \quad (9)$$

(see "*Techniques de l'Ingénieur*", pp J 1065–3)
in the case of a granular bed:

$$\frac{\Delta P}{L} = 182 \times \frac{(1-\varepsilon)^2}{\varepsilon^2 \times \phi^2} \times \eta \times u + 1.92 \times \frac{1-\varepsilon}{\varepsilon^2 \times \phi} \times \rho \times u^2 \text{ (in Pa/m)} \quad (10)$$

In these formulae, u is the discharge velocity.

Formula (10) is the Ergun formula (chem. Eng. Prog., 48, p.89, 1952) with the coefficients suitable for zeolites in bead form; a person skilled in the art will know how to obtain the coefficients corresponding to other types of particulate adsorbents, by direct measurement or with the help of the literature (I. F. McDonald et al., Ind. Eng. Chem. Fundam. Vol. 18, No. 3, 1979, pp. 199–208 and R. M. Fand, J. Fluid Eng., Vol. 109, September 1987, pp. 268–274).

The present invention consists in improving the geometry and/or the transport properties of the adsorbent by keeping the head losses at their minimum.

There are two types of configuration for fixed-bed adsorption:

the granular bed, in which the adsorbent in the form of particles of various shapes is placed "loosely" in an adsorber. Because of the isotropic structure, the gas can circulate axially or radially (centrifugal or centripetal circulation). The particles may be in the form of spheres, ellipsoids, cylinders or equivalent shapes, the ratio of the bed dimension to the particle dimension being large enough for it to be possible to reckon on using the isotropic continuous medium approximation;

the "monolith", consisting of a more or less rigid mass of adsorbent placed so as to allow the gas to pass through it in pipes close to linearity, of various cross sections (circular, elliptical, square, rectangular, star-shaped or in the form of slots).

Starting from the above, the inventors of the present invention have demonstrated that it is possible to define the geometry of the adsorbents so as to make the fullest use of the transport capability of the material with a low head loss.

The term "geometry" is understood to mean the characteristic dimension of the space allotted to the gas phase and to the solid phase.

The above formulae (1) to (4) involve such dimensions.

For a given shape, the characteristic dimension reduces to a scale factor.

For any shapes, use is made of quantities such as a surface-to-perimeter ratio (hydraulic diameter) and the surface-to-volume ratio (sphericity factor). It is thus possible to calculate such quantities for most of the geometries and, where necessary, it is always possible to calculate the mass transfer by a numerical solution of the transport equations, and then to compare the results with those from a sphere.

According to the invention, the above Equations (1) to (10) are used to solve the problems associated with determining the optimum conditions with regard to mass transfer and head loss.

The invention therefore consists in improving the dimensions of the gas and solid phases for the purpose of balancing the rates for the two phases with the energy cost due to the minimum head losses.

Three factors consequently have to be taken into account:

$\tau_s$, which is the rate constant for transfer in the solid phase;

$\tau_g$, which is the rate constant for transfer in the gas phase; and $\Delta P/L$, which is the head loss.

The first aim is to balance the rate constants for the two media, i.e. $\tau_s \approx \tau_g$.

Now, it is not apparent from the previous studies that it is important for the two mass transfer mechanisms to introduce comparable resistances, resulting, from Equations (1) to (8), in relationships between geometrical properties and transport properties of the solid being defined.

One may either have to modify the respective sizes of the phases, or to modify the solid phase (porosity, tortuosity).

Next, Equations (9) and (10) are used to optimize the head loss. One particular geometry may have to be chosen.

The kinetics and head-loss criteria are not independent and the crux of the invention is the fact that it allows the ensemble, namely the geometry-size-material, to be completely defined so as to optimize the ensemble from the standpoint of kinetics and head loss.

EXAMPLE 1

Definition of the geometrical proportions for equipartition of the rate constants.

In the case of a structure consisting of linear channels, the constraint to be met is therefore:

$$\tau_g \approx \tau_s \text{ i.e. } \frac{D_g}{R_g^2} \approx \frac{D_s}{R_s^2} \text{ or else } \frac{R_s}{R_g} \approx \sqrt{\frac{D_s}{D_g}} \quad (11)$$

or else, according to the simple model $$\frac{R_s}{R_g} \approx \sqrt{\frac{\varepsilon}{\tau}} \quad (12)$$

This amounts to linking the geometrical ratio of the solid and gas phases to their respective transport properties. It may be seen that it also allows the porous structure of the solid phase to be introduced. $R_s$ and $R_g$ are scale factors. The exact value of each has to be accurately determined according to the configuration, for example:

circular, elliptical, square, hexagonal or other channels;
arrangement of the channels in a square, hexagonal, triangular or other network;
channels in the form of slots, flattened rectangles, etc.

The adsorbent may thus be optimized, on the basis of Equation (11), by adjusting the geometry or by adjusting the diffusivity of the adsorbent material, or else by varying both factors.

Thus, in the case of a granular bed, the constraint to be met is:

$$\tau_g \approx \tau_s \text{ i.e. } 15 \times \frac{D_s}{R_s^2} \approx k_f \times \frac{S}{V} \quad (13)$$

where $R_s$ is the radius, in the case of a sphere, or in general the half-thickness of the solid phase.

The factor 15 comes from calibrating the film transfer equation (first-order ordinary differential equation) and the diffusion equation (second-order partial differential equation)—see the above documents.

From this we therefore obtain, in the case of spherical particles:

$$15 \times \frac{D_s}{R_s^2} \approx k_f \times \frac{3}{R_s} \text{ i.e. } 5 \times \frac{D_s}{R_s} = k_f \quad (14)$$

Here again, a relationship is established between the transport properties and the geometrical properties of the gas and solid phases.

Next, the dimensions or the properties of the solid phase, or both, are modified in order to satisfy Equation (14).

It should be pointed out that, for the granular adsorbents currently available, the above criterion is not met, that is to say the film diffusion is much more rapid than the macropore diffusion (see, for example, Ruthven, p. 217).

EXAMPLE 2

Definition of the geometrical scale for the head losses.

A head loss also places substantial constraints on the acceleration of the PSA/VSA cycles. The reduction in cycle time necessitates an increase in the surface-to-volume ratio of the adsorbent, and therefore a reduction in size of the gaseous medium favourable to head losses, as well as an increase in the gas velocities, which is an additional factor increasing the head losses. Here again, the granular adsorbents currently available do not correspond to the desired optimum: adsorbent beads much smaller in size than 1 mm cannot be used because of the resulting head losses, except in particular applications in which the consumption of energy is of but little importance, such as personal medical oxygen generators.

Knowing the characteristic dimension and the porosity of the solid medium, Equations (9) and (10) can be used to calculate the head loss.

Let $$\left.\frac{\Delta P}{L}\right|_{\text{lim}}$$

be the maximum acceptable value of the head loss.

For linear channels, formula (9) gives:

$$\frac{u}{\phi^2} = \frac{1}{32 \times \eta} \times \left.\frac{\Delta P}{L}\right|_{\text{lim}}$$

For a granular bed, Equation (10) gives:

$$\left.\frac{\Delta P}{L}\right|_{\text{lim}} = 182 \times \frac{(1-\varepsilon)^2}{\varepsilon^3 \times \phi^2} \times \eta \times u + 1.92 \times \frac{1-\varepsilon}{\varepsilon^2 \times \phi} \times \rho \times u^2$$

It is within the competence of a person skilled in the art to solve these equations in u and φ and thus find the relationship φ=f(u) which meets the $$\left.\frac{\Delta P}{L}\right|_{\text{lim}}$$

constraint.

In short, as is clear from Examples 1 and 2 above, the calculations specific to the invention is carried out in the following manner.

Firstly, the geometry and/or the adsorbent material are defined in such a way that the mass transport rate constants in the gas phase and in the solid phase are similar.

Next, the scale factor and/or the configuration are defined in such a way that the head loss is acceptable under the PSA/VSA cycle conditions defined in terms of cycle time and gas velocity.

For round-trip work based on reciprocal adjustment of the geometry and the scale factor of the adsorbent, that configuration which meets the kinetics and head loss criteria is determined or, failing this, that configuration which approaches them as closely as possible.

EXAMPLE 3

As an example, for a VSA/PSA cycle based on a granular bed, conditions are set such that the gas velocity during at least one of the adsorption phases is 1 m/s and such that the adsorption rate expressed by the LDF (Linear Driving Force) model parameter is ak=20 s$^{-1}$.

The LDF model expresses the adsorption rate in linear form as a function of the deviation from equilibrium:

$$\frac{dq}{dt} = a'_k \times (q^* - q) \text{ or } a_k \times (P - P^*) \qquad a'_k \approx \frac{a_k \times 2}{\left(\frac{q}{P^*} + \frac{q^*}{P}\right)} \quad (15)$$

where P is the actual pressure, q is the actual mean amount adsorbed, P* is the pressure corresponding to equilibrium with the amount q, and q* is the amount adsorbed at equilibrium with the pressure P:

$$q^* = f(P), \ q = f(P^*), \ f(p) = \text{isotherm}.$$

The modelling of PSA cycles using the LDF model to describe the kinetics is very widely practiced (see the documents by Ruthven or Yang).

As the diffusion mechanism in the gas phase results in transfer via the boundary layer (see Equation (3)), then:

$$a_k = k_f \times \frac{S}{V} \qquad (16)$$

The diffusion mechanism in the solid phase is expressed (see formula (1)) by:

$$a_k = 15 \times \frac{D_s}{R_s^2} \qquad (17)$$

For a granular-bed structure, the calculation then proceeds as follows. Formula (6) is applied in the case of mass transfer:

$Sh = 0.357/\epsilon \times 0.35 \times Re^{0.64} \times Sc^{0.33}$, i.e.

$$k_f = \frac{D_g}{2 \times R_s} \times \frac{0.357}{\epsilon} \times Re^{0.64} \times Sc^{0.33} \qquad (19)$$

The rate criterion is:

$$15 \times \frac{D_s}{R_s^2} = k_f \times \frac{3}{R_s} = a_k \qquad (20)$$

where $\phi = 2 \times R_s$

A person skilled in the art knows how to solve equations (19) and (20) and establish the relationship $D_s = f(R_s, u)$, or one of the other two relationships in $R_s$ and $u$ which satisfies equation (20).

The head loss is:

$$\frac{\Delta P}{L} = 182 \times \frac{(1-\epsilon)^2}{\epsilon^2 \times \phi^2} \times \eta \times u + 1.92 \times \frac{1-\epsilon}{\epsilon^3 \times \phi} \times \rho \times u^2 \qquad (21)$$

If we set a limiting head loss, equation (21) adds a constraint $R_s = g(u)$. The above relationship in f reduces to $D_s = h(u)$. All that then remains to be done is to adjust the cycle time, which defines u, to the intrinsic diffusivity of the adsorbent.

The manner of applying the method to other configurations (granular bed or channels) and to other regimes (laminar or turbulent) lies within the competence of a person skilled in the art.

Likewise, the calculations may be made for any type of gas for which the parameters given in the above formulae are known. By measuring the properties of an adsorbent with respect to a given gas, such as air at 1 bar and 20° C., it is possible to define all the parameters defined within the context of the present invention and to calculate the properties of the adsorbent for other gases, temperatures and pressures.

To illustrate another way of optimizing the adsorbent with respect to the cycle, we start with a VSA/PSA cycle with a given, preferably short, cycle time, for example from 1 s to 30 s, the characteristics of which are the pressure diagram, the definition of the steps and the time allotted to each of them, and with an adsorbent having known adsorption properties, the characteristics of which are the adsorbed amounts of each of the constituents and, as a corollary, the relative amounts, that is to say the selectivity.

From this it is then possible, by simulation or by trials, using long cycle times, for example, from 60 s to 300 s, to obtain the limiting performance characteristics of the adsorbent under conditions in which thermodynamic irreversibilities do not take place.

In practice, the adsorbent in its industrially utilizable, for example agglomerated, form exhibits irreversibilities which are essentially the head losses and the finite adsorption rate.

The invention therefore makes it possible to define the characteristics that the adsorbent must possess in order to approach as closely as possible the desired limiting performance.

To do this, the acceptable limiting head loss is firstly set. The flow velocities of the gas are calculated from the properties of the adsorbent and from the characteristics of the cycle. The equations given in the invention are then used to calculate the geometry of the transport network.

Furthermore, the parameter $D_s/R_s^2$ is calculated from the principle of the rate constant in the gas phase and the rate constant in the solid phase being virtually equal. It only remains to adjust the respective values of $D_s$ and $R_s^2$.

If several configurations seem to be acceptable, a choice is made based on other criteria, such as cost, processing, etc.

EXAMPLE 4

A numerical application of the above, applied to an oxygen/nitrogen mixture, such as air, at 20° C. and 1 bar, results in:

$D_m = 1.5 \times 10^{-5}$ m$^2$/s $\eta = 1.5 \times 10^{-5}$ Pa.s $\rho = 1.3$ kg$\pm$m$^{-3}$ From this, for a granular bed of 0.35 porosity, with a diameter of 1 mm and gas flow velocity of 1 m/s, formula (10) is used to calculate the head loss:

$$\frac{\Delta P}{L} = 66100 \text{ Pa/m}$$

Equation (6) makes it possible to calculate:

$k_f = 0.225$ s$^{-1}$.

Equation (14) gives:

$$\frac{D_s}{R_s} = 0.045 \ s^{-1}, \text{ i.e. } D_s = 2.25 \times 10^{-5} \text{ m}^2/\text{s}.$$

It has indeed been confirmed that the standard granular beds are not optimal, since the diffusivity of the material ought to be greater than the molecular diffusivity.

Likewise, for a straight pipe 1 mm in diameter, formula (9) gives:

$$\frac{\Delta P}{L} = 624 \text{ Pa/m}.$$

Formula (11) then gives:

$$\frac{R_s}{R_g} \approx \sqrt{\frac{D_s}{D_g}}$$

Thus, for example, if $D_s=5.6\times10^{-6}$ m²/s, then:

$$\frac{R_s}{R_g} = \sqrt{\frac{5.6\cdot 10^{-6}}{1.5\cdot 10^{-5}}} = 0.61$$

Here again, it will be understood that it is also possible to calculate any one of the parameters $D_g$, $D_s$ and $R_s$ knowing the other two.

Based on the same formulae, it is possible to start with a given head loss and calculate the corresponding particle size and consequently the corresponding $D_s$. With this set of equations, it is possible to fix any one parameter and deduce the other parameters therefrom, depending on the intended practical objective.

What is claimed is:

1. Process for separating or purifying a gas mixture which comprises adsorbing at least one gaseous compound from said gas mixture on an adsorbent material comprising an adsorbent solid phase and a gas phase ensuring transport of the gaseous components right to the adsorbent phase, said adsorbent material being such that the constants for the transport kinetics of the components adsorbable in the gas phase and in the solid phase are in a ratio of between 0.1 and 10 defined for a gas discharge velocity of 0.2 m/s measured on air at 1 bar and 20° C.

2. Process according to claim 1, wherein the gas mixture contains oxygen and nitrogen and at least some of the nitrogen is adsorbed on the adsorbent material so as to produce an oxygen-enriched gas stream.

3. Process according to claim 1, wherein the gas mixture to be purified contains hydrogen and at least one impurity selected from the group consisting of CO, $CH_4$, $CO_2$, $O_2$, and $N_2$ and at least some of the impurities are adsorbed on the adsorbent material so as to produce a hydrogen-enriched gas stream.

4. Process according to claim 3, wherein the gas mixture contains at least hydrogen and CO.

5. Process according to claim 1, wherein the gas mixture to be purified is air containing at least one impurity selected from the group consisting of $CO_2$ and $H_2O$ and at least some of the impurities are adsorbed on the adsorbent material so as to produce purified air stripped of at least some of the impurities, the purified air being subsequently subjected to a cryogenic distillation step.

6. Process for separating or purifying a gas mixture which comprises adsorbing at least one gaseous compound from said gas mixture on an adsorbent material comprising an adsorbent solid phase and a gas phase ensuring transport of the gaseous components right to the adsorbent phase, said adsorbent material being such that the constants four the transport kinetics of the components adsorbable in the gas phase and in the solid phase are in a ratio of between 0.1 and 10 defined for a gas discharge velocity of 0.01 m/s measured on hydrogen at 30 bar and 40° C.

7. Formed adsorbent material comprising an adsorbent solid phase and a gas phase ensuring transport of the gaseous components right to the absorbent phase, said material being such that the constants for the transport kinetics of the components adsorbable in the gas phase and in the solid phase are in a ratio of between 0.1 and 10 defined for a gas discharge velocity of 0.2 m/s measured on air at 1 bar and 20° C.

8. Adsorbent material according to claim 7, wherein the ratio is between 0.5 and 4.

9. Adsorbent material according to claim 7, wherein said adsorbent material is such that the head losses for a gas discharge velocity of 0.2 m/s are between 250 and 75,000 Pa/m.

10. Adsorbent material according to claim 9, wherein the head loss is between 500 and 35,000 Pa/m.

11. Adsorbent material according to claim 7, used in a cycle such that the velocity of the gas through the adsorbent exceeds 0.3 m/s.

12. Adsorbent material according to claim 11, wherein the velocity of the gas is greater than 0.4 m/s.

13. Adsorbent material according to claim 7, wherein the gas phase has a mean dimension ranging between 0.01 and 1 mm for ensuring convective transport of the gas.

14. Adsorbent material according to claim 13, wherein the mean dimension of the gas phase is between 0.01 and 0.3 mm.

15. Formed adsorbent material comprising an adsorbent solid phase and a gas phase ensuring transport of the gaseous components right to the adsorbent phase, said material being such that the constants for the transport kinetics of the components adsorbable in the gas phase and in the solid phase are in a ratio of between 0.1 and 10 defined for a gas discharge velocity of 0.01 m/s measured on hydrogen at 30 bar and 40° C.

16. Adsorbent material according to claim 15, wherein the ratio is between 0.5 and 4.

17. Adsorbent material according to claim 16, wherein said adsorbent material is such that the head losses for a gas discharge velocity of 0.2 m/s are between 250 and 75,000 Pa/m.

* * * * *